(12) United States Patent
Tremblay et al.

(10) Patent No.: US 8,384,722 B1
(45) Date of Patent: Feb. 26, 2013

(54) APPARATUS, SYSTEM AND METHOD FOR PROCESSING IMAGE DATA USING LOOK UP TABLES

(75) Inventors: Yves Tremblay, Pointe-Claire (CA); Francois Roberge, Montreal (CA)

(73) Assignee: Matrox Graphics, Inc., Dorval (CA)

( * ) Notice: Subject to any disclaimer, the term of this patent is extended or adjusted under 35 U.S.C. 154(b) by 1044 days.

(21) Appl. No.: 12/336,960

(22) Filed: Dec. 17, 2008

(51) Int. Cl.
G06F 15/16 (2006.01)

(52) U.S. Cl. ........................ 345/502; 345/602

(58) Field of Classification Search .......... 345/602
See application file for complete search history.

(56) References Cited

U.S. PATENT DOCUMENTS

| | | |
|---|---|---|
| 4,752,893 A | 6/1988 | Guttag et al. |
| 4,772,881 A | 9/1988 | Hannah |
| 5,025,249 A | 6/1991 | Seiler et al. |
| 5,038,300 A | 8/1991 | Seiler et al. |
| 5,430,465 A | 7/1995 | Sabella et al. |
| 5,764,201 A * | 6/1998 | Ranganathan ............... 345/3.3 |
| 6,411,302 B1 | 6/2002 | Chiraz |
| 6,693,643 B1 * | 2/2004 | Trivedi et al. ............... 345/602 |
| 6,819,331 B2 | 11/2004 | Shih et al. |
| 6,829,694 B2 | 12/2004 | Stein et al. |
| 6,897,877 B2 | 5/2005 | Marion et al. |
| 6,970,504 B1 | 11/2005 | Kranawetter et al. |
| 7,154,509 B2 | 12/2006 | Nair et al. |
| 8,149,245 B1 * | 4/2012 | Buck et al. ............... 345/601 |
| 2004/0233484 A1 | 11/2004 | Seko et al. |
| 2006/0132874 A1 * | 6/2006 | Ishikawa ............... 358/518 |
| 2008/0117228 A1 * | 5/2008 | Lee et al. ............... 345/602 |

FOREIGN PATENT DOCUMENTS

EP  1054351 A2  11/2000

* cited by examiner

Primary Examiner — Kee M Tung
Assistant Examiner — Ryan D McCulley
(74) Attorney, Agent, or Firm — Rhodes Donahoe, P.C.

(57) ABSTRACT

According to one aspect, a display controller is included in a graphics processing system where the display controller includes a plurality of look up tables in a data path. According to one embodiment, each of the plurality of look up tables is configured to be coupled to a source of surfaces, each of the plurality of look up tables includes circuitry that is physically separate from circuitry included in others of the plurality of look up tables, and the display controller is configured to employ a combination including at least two of the plurality of look up tables to process a first component of a plurality of pixels included in a surface received from the source of surfaces.

6 Claims, 7 Drawing Sheets

Figure 1 - Prior Art

APPARATUS, SYSTEM AND METHOD FOR PROCESSING IMAGE DATA USING LOOK UP TABLES

BACKGROUND OF INVENTION

1. Field of Invention

Embodiments of the invention generally relate to graphics systems, and in particular to display controllers employed in graphics processing systems.

2. Discussion of Related Art

Display controllers are often used in computer systems to output and format surfaces to a display monitor. In general, the display controller is included in graphics processing systems.

FIG. 1, illustrates an example of a system 10 including a set 11 of processing units 1, 2 . . . N, a memory unit 12 and a graphics processing system 13 used to generate images for display on a display device 14 (e.g., screen, display, monitor, etc.). The system 10 may also include a bus 15 that interconnects various elements of the system 10. The graphics processing system 13 may receive instructions from an application running on at least one of the processing units 11 to generate a virtual image or to process graphics or video data for display on the display device 14. The graphics processing system 13 may be used to display images on more than one display device and each of the devices may be of different types (TV, wall, monitor, etc). In some embodiments, one or more of the display devices may be included in a video processing system. In a version of these embodiments, the video processing system may include a video recorder and/or monitor. In some embodiments, the processing units 11 may include a host processor (commonly referred to as a CPU). System 10 may also include dedicated processing units such as a video editing processor and/or an image processing unit among the set of processing units 11.

As illustrated in FIG. 1, a graphics processing system 13 may include an interface 21, a graphics processor 22, a video memory 23, a display controller 24 and an output port 25. The video memory may be external to the graphics processing system 13. The video memory 23 may store instructions and data sent by an application running on one of the plurality of processing units 11. Further the video memory may store intermediate data while it is being processed in the graphics processor or may store processed data once the processing is completed. In general, the interface 21 is used to connect the graphics processing system 13 to the processing units 11 and the memory 12 through the bus 15. The graphics processor 22 may receive data and instructions through the interface 21. Once processed, data is stored in the video memory 23 as a surface and is output by the display controller 24 to the display device 14. The display controller 24 may receive control data through interface 21. The display controller 24 may be configured by a driver to output a surface from the video memory 23 through the output port 25 and to format the surface according to the monitor's parameters (e.g., device resolution, refresh rate, etc.) such that it includes all synchronization signals. These parameters may be defined at an initialization step, when the system 10 is switched on, or they may be defined by a user at any moment during the system's run time. A surface provided from the output port 25 may be referred to as an image because the surface is formatted by the display controller to be suitable for display on a display device. Further, as used herein the terms "surface", and "video surface" refer to a set of pixels intended for display together on a display device where each pixel is associated with a set of color components. The term "image" as used herein refers to a surface which is formatted for display. In some graphics processing systems there may be a plurality of display controllers.

In general, image data is stored in video memory as a set of pixels forming a surface and each pixel is associated to a plurality of attributes such as color components and Alpha value. An Alpha value may indicate the transparency of a pixel. Color components of a pixel may be represented in a variety of color spaces. RGB, YUV, YCbCr or grayscale are examples of color spaces. Color components may have different formats. For example, if data is represented in RGB color space, the three color components may include 10 bits of data each, 12 bits or 24 bits of data each, etc. Alternatively, the red color component may include 8 bits of data while the two other components, green and blue, may include 10 bits of data. One may note that for each color space there may be different color component formats for the various color components.

In some embodiments, color components of a pixel may need to be modified before being displayed or output from the graphics controller. In some applications, a surface is processed according to a non-linear function. In one embodiment, a non-linear function may be used to highlight a portion of a surface to better view the selected portion on a display device. In another embodiment a set of color components may be processed in order to put emphasis on some details of a surface when displayed on a display device. In a different embodiment non-linear functions may be used to apply a threshold on color components of a surface. In this example, pixels of the surface with color components equal to or higher than a threshold are displayed. Non-linear functions are complex and may be implemented using a dedicated hardware module in the graphics controller. For example memory blocks organized as look up tables may be used to implement non-linear functions.

In some prior art approaches, the display controller includes a single hardware look up table. In these examples the look up table is configured to include elements of a non-linear function. During the processing step of the prior art, the set of color components associated with a pixel is used as an index to access an element of the non-linear function stored in the look up table. The element retrieved from the look up table contains new values of color components associated with the pixel. In an example where each pixel includes three components of 10 bits each, each one of these color components may have 1024 possible values. Consequently, the look up table should include 1024×1024×1024 locations to store the 1024×1024×1024 values of the non-linear function. In this example, the color components of a pixel are used as an index of 30 bits to access a location in the look up table configured with a non-linear function of 1024×1024×1024 values. This requires a large memory block to store the lookup table and may require a significant amount of processing time to configure the look up table with the non-linear function.

In some other prior art approaches, the graphics controller may include three separate hardware look up tables where each one of them is dedicated to process one color component of a pixel. This approach may be more efficient and necessitates less hardware real estate, since each look up table needs to store a number of locations sufficient to process only a single color component. For example, if a surface is represented in a RGB color space and each color component of a pixel corresponds to 10 bits of data, the first 10 bits of a pixel may be used to access a location in a first look up table, the following 10 bits of the same pixel may be used to access a location in a second look up table and the last 10 bits of the same pixel may be used to access a location in a third look up table. The three processed color components retrieved from the different look up tables are further transferred to another processing module or output from the graphics system.

The size of a pixel, for example, the number of bits included in a pixel affects the degree of precision with which the pixel can be represented. In general, the larger the pixel the greater degree of precision and/or accuracy with which the pixel can be processed for display. In prior art approaches, the precision with which a pixel can be processed is sometimes limited by the number of locations that a look up table or the set of look up tables may include or by the number of bits that may be stored at each location of a look up table. That is, in prior approaches, the size of a look up table provides the number of bits that can be used by a display controller to process a pixel. For example, a graphics controller can include three look up tables, where each one has 1024 locations. If the data processed is represented by three color components of 12 bits there will be only 1024 locations available for storing elements of a non-linear function to process each color component instead of the 4096 locations required. In other embodiments, the memory used to store the look up table may be sufficiently large as to include all possible values of a non-linear function to process the largest pixel that may be processed by a graphics system. However since in most cases a graphics system does not process large pixels, there will be a huge loss of hardware real estate that could otherwise have been used for other critical processing modules of the graphics system.

In addition, prior approaches employ a fixed quantity of look up tables each having a fixed size in a display controller. These approaches provide an inflexible configuration that can only process pixels with a fixed number of functions which are limited in size.

SUMMARY OF INVENTION

According to some embodiments, the invention provides a programmable graphics system that can apply linear or non-linear functions to pixels of a video surface with a high degree of precision. That is, some embodiments provide a display controller that can process pixels with increased accuracy and provide for a greater degree of granularity in the color and/or intensity of the pixel. For example, in one embodiment, an image is monochrome and the color of each pixel is selected from gray scale colors (i.e., shades of gray) and the intensity of each pixel can vary from black to white. According to this embodiment, a display controller can provide increased accuracy of the shade of gray of the pixels because more intensity values are available between black and white because more bits are available with which to represent the intensity of each pixel.

Also, some embodiments provide a display controller with increased flexibility that allows the display controller to process a video surface with a much wider range of non-linear functions. According to one embodiment, the display controller employs combinations of look up tables, where each look up table is a separate circuit from others of the look up tables, and can change configurations and combinations of the look up tables on-the-fly depending upon the requirements for the video surface which is being processed. That is, the display controller can employ a first combination of look up tables to process a component of a first video surface and a second different combination of the same look up tables to process a component of a second video surface. In addition, the display controller can employ a single look up table to process a component of a video surface. According to one embodiment, the display controller is configured to employ a combination when a combination mode is established in response to at least one of a format of the data of the surface and a size of a nonlinear function received by the display controller, for example, from an application or from the operating system.

According to one aspect, a display controller is included in a graphics processing system where the display controller includes a plurality of look up tables in a data path. According to one embodiment, each of the plurality of look up tables is configured to be coupled to a source of surfaces, each of the plurality of look up tables includes circuitry that is physically separate from circuitry included in others of the plurality of look up tables, and the display controller is configured to employ a combination including at least two of the plurality of look up tables to process a first component of a plurality of pixels included in a surface received from the source of surfaces.

According to another aspect, a system for color modification of image data, the system includes a first display controller including a first plurality of look up tables included in a first data path that also includes a first plurality of data channels, and a second display controller including a second plurality of look up tables included in a second data path including a second plurality of data channels where the second plurality of data channels are different than the first plurality of data channels. In accordance with one embodiment, the system also includes a source of video surfaces coupled to each of the first plurality of data channels and the second plurality of data channels, where the source of video surfaces provides a video surface including a plurality of pixels to the first display controller on the first data path, and the system also includes a communication link coupling at least one of the second plurality of look up tables to at least one of the first plurality of data channels, wherein data for a first component of the plurality of pixels is communicated via the communication link from the at least one of the first plurality of data channels to a look up table included in the second plurality of look up tables. In accordance with some embodiments, in a first mode of operation, the first display controller is configured to employ at least one of the first plurality of look up tables to process the first component of the plurality of pixels, and in the first mode of operation, the look up table included in the second plurality of look up tables is employed in processing the first component of the plurality of pixels.

In yet another aspect, the invention provides a method of processing surfaces with a display controller of a graphics processing system, the display controller including a plurality of look-up tables each of the plurality of look up tables including circuitry that is physically separate from circuitry included in others of the plurality of look up tables, the method comprising the acts of: including elements of a processing function in at least two of the plurality of look up tables; receiving a first video surface from a source of surfaces, the video surface comprising a plurality of pixels; and employing the at least two of the plurality of look up tables in combination with one another to process a first component of the plurality of pixels with the processing function included in the at least two of the plurality of look up tables.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
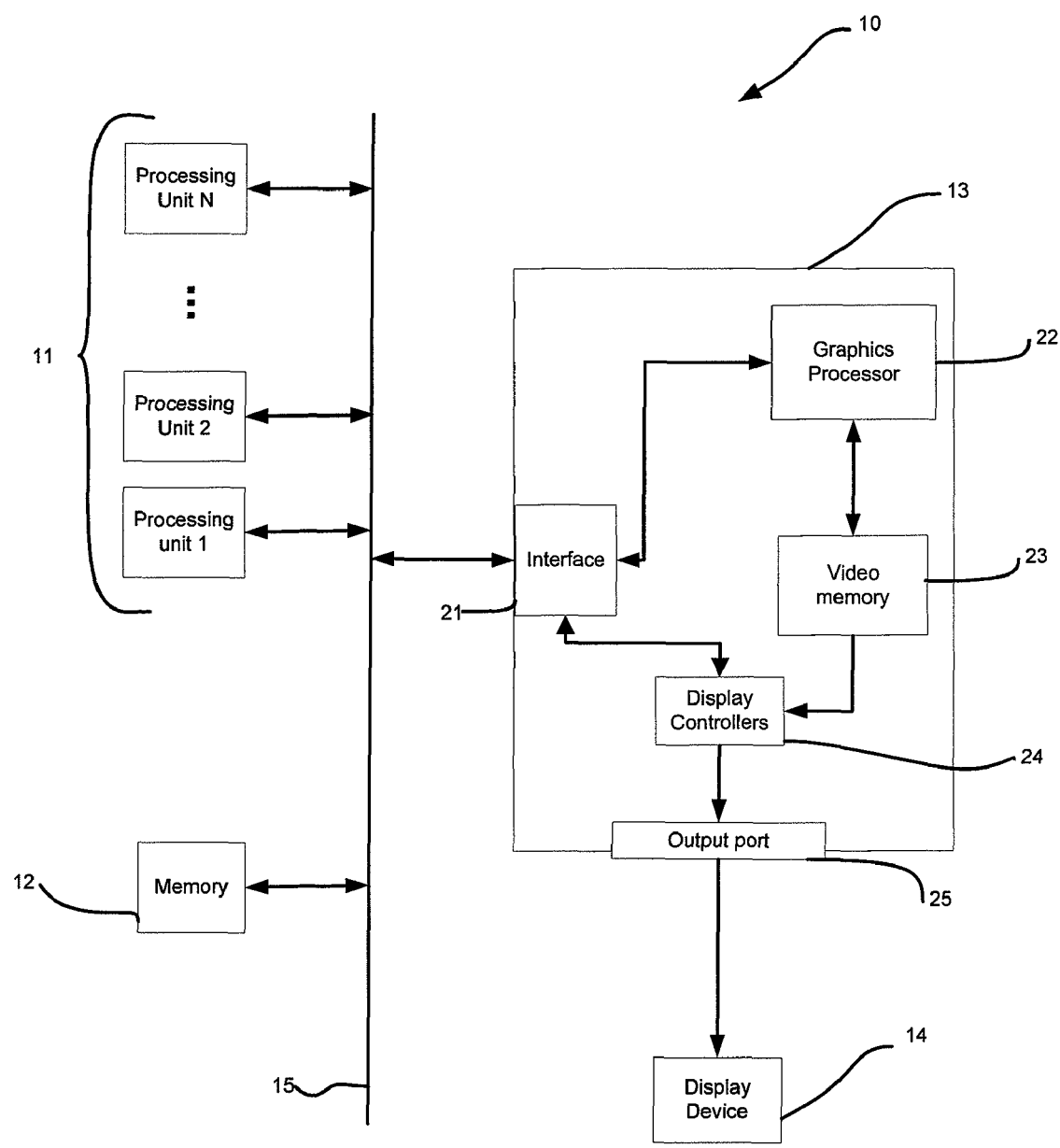
FIG. 1 illustrates a system including a graphics processing system.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of terms such as "including," "comprising," "having," "containing," and "involving" is meant to encompass the items listed thereafter and equivalents thereof, as well as additional items.

Figure 2:
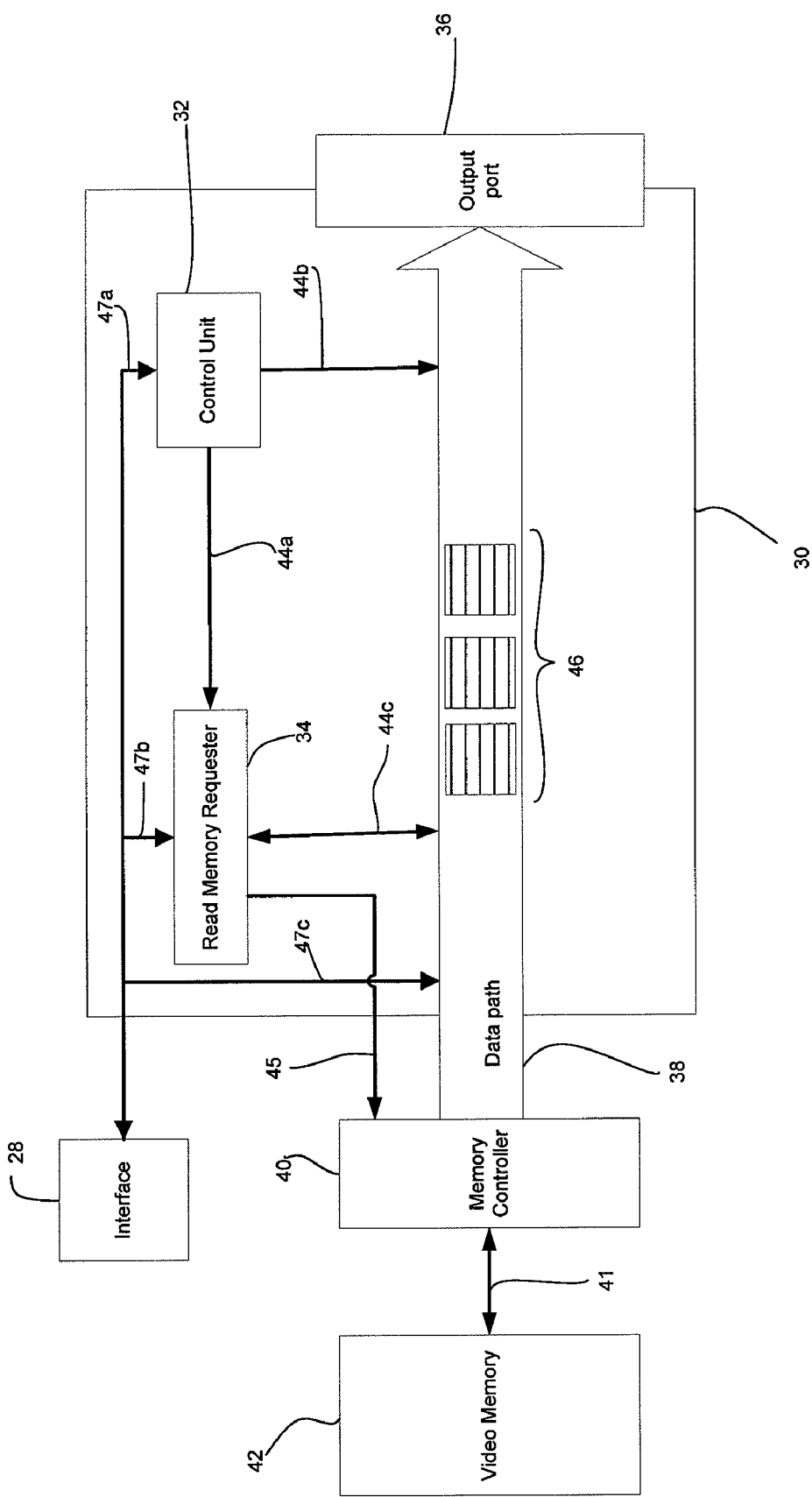
FIG. 2 illustrates elements of a display controller connected to a video memory in accordance with an embodiment of the invention.

Referring to FIG. 2, a display controller 30 is illustrated in accordance with one embodiment. In accordance with the illustrated embodiment, the display controller 30 includes a control unit 32, a read memory requester 34, an output port 36 and a data path 38. In one embodiment, the display controller 30 is employed in a graphics processing system. In the illustrated embodiment, the display controller 30 is connected to a video memory 42 through a memory controller 40 and further connected to an interface 28. Further, various communication paths 44 are included within the display controller 30, for example, a first communication path 44A between the control unit 32 and the read memory requester 34, a second communication path 44B between the control unit 32 and one or more elements included in the data path 38 and a third communication path 44C between the read memory requester 34 and one or more elements of the data path 38. As illustrated, an additional communication link 45 connects the read memory requester 34 to the memory controller 40. Further, a communication link 41 connects the memory controller to the video memory 42. Additional communication links 47a, 47b and 47c connect the control unit 32, the read memory requester 34 and the data path 38, respectively, to the interface 28. According to some embodiments, the communication link 41 provides for bi-directional communication between the memory controller 40 and the video memory 42.

In some embodiments, the communication path 44 includes one or a plurality of communication busses. Further, the communication paths 44, 45 and 47 may be bi-directional communication paths in one or more embodiments. While in other embodiments, one or more portions of the communication paths 44 are uni-directional. The communication paths 44, 45 and 47 may communicate instructions, commands, handshake signals and/or requests. Further, the communication link 41 may communicate instructions, commands, requests and/or data.

In various embodiments, the data path 38 may include a plurality of hardware elements or a combination of one or more hardware and software elements that are employed by the display controller 30 to process a surface. In one embodiment the data path 38 includes a set of look up tables 46 to process data.

According to one embodiment, the video memory 42 stores image data, for example, one or more complete surfaces for display on one or more display devices. Each surface includes a set of pixels and each pixel is associated with a set of color components. The video memory 42 may be included in a local memory while in an alternate embodiment the video memory is included in a system memory. In general, one or more surfaces are received from the video memory 42 through the memory controller 40 and undergo one or more steps of processing (e.g., a processing sequence) before being output at the output port 36 as one or more images.

In general, the display controller 30 operates to request at least one surface from a source of surfaces. The source of surfaces is described here as the video memory 42. The display controller 30 formats the surface received from the video memory 42 for display on a display device (e.g., a monitor, a TV, a display wall, etc.) or to be received by a processing system, for example, a video processing system, an image processing system, etc. The formatted surface referred to as image is provided at an output port 36. In accordance with one embodiment, the general operation includes the generation of control signals such that the image is output by the display controller 30 at a predetermined refresh rate and resolution. For example, the control unit 32 generates a plurality of signals (hsynch, vsynch, hblank, vblank, etc.) that are used by the display controller 30 to synchronize and set up the surface in the proper format of an image for display. In some embodiments, the display controller may include more than one output port and the image may be output more than once from the display controller to a plurality of output devices.

In addition, in accordance with various embodiments, the data path 38 may include a plurality of processing modules, for example, a plurality of FIFOs, a memory receiver, color converters and a plurality of look up tables.

In accordance with one embodiment the data path 38 may include a memory receiver for receiving and formatting data provided from the video memory. The memory receiver may receive a stream of pixels and may format each pixel for processing by another component of the data path.

Figure 3:
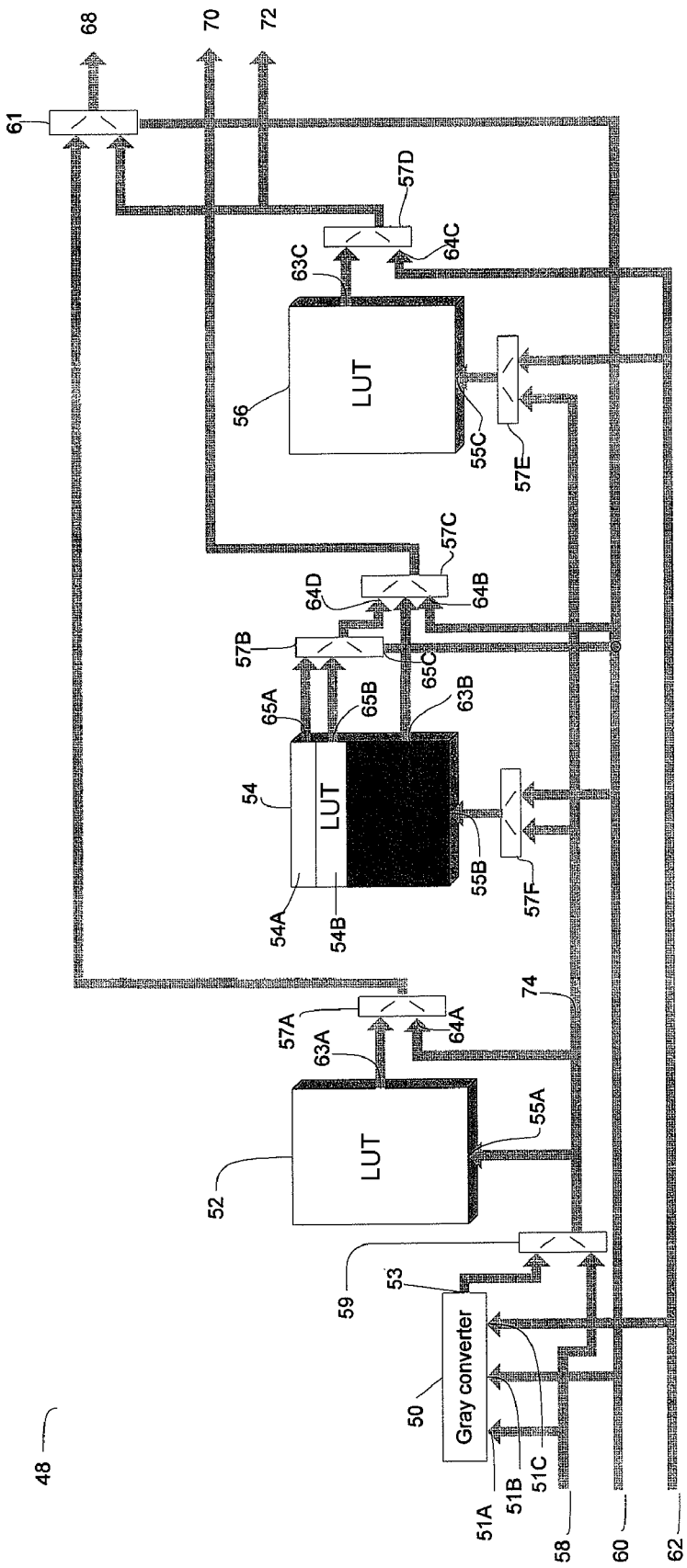
FIG. 3 illustrates a plurality of look up tables included in a display controller in accordance with an embodiment of the invention.

Further, the data path may include three look up tables. For example as illustrated in FIG. 3, the data path 48 may include a first look up table 52, a second look up table 54 and a third look up table 56. According to some embodiments, each look up table is separate from others of the look up tables. That is, each look up table includes circuitry which is physically separate from others of the look up tables. According to one embodiment, each look up table only includes circuitry which is separate from others of the look up tables. In a further embodiment, each look up table may be configured to include elements of a non-linear function used for the processing of a given color component of a pixel.

Thus, according to some embodiments, a display controller includes three look up tables where each look up table is a piece of hardware having a fixed capacity (i.e., a fixed amount of data which can be stored in it, for example, a fixed quantity of bits) which is distinct and separate from the hardware of others of the three look up tables. Further, these physically distinct look up tables can be employed in combination with one another to process the same component of a plurality of pixels to provide greater granularity and/or accuracy in the color (including the gray-scale intensity) provided by each pixel. Accordingly, the preceding approach provides much greater flexibility than some prior approaches that use a single look up table to process the same component of a pixel, because embodiments described herein can take advantage of the capacity provided by a plurality of different look up tables by employing the look up tables in combination with one another. According to one embodiment, a distinct and physically separate look up table can be identified because the look up table includes an input and all the locations in the look up table are connected to the same input, for example, to the same physical data channel. As described in greater detail herein, in some embodiments, the look up table stores elements of more than one function. That is, some of the data received at the input is processed by a first function from a first region of the look up table, while some other data received at the input is processed by a second function from a second region of the look up table. Further, in some embodiments, the input of the look up table is coupled to a plurality of data channels by a multiplexer.

Although embodiments described herein refer to a look up table as a distinct piece of hardware, for example, circuitry, it should be apparent to those of skill in the art that the look up table may also include software in some embodiments.

In some embodiments, each one of the plurality of look up tables may include N locations to store N elements of a non-linear function. Each element of the non-linear function may be represented with m binary elements (i.e., bits). In accordance with one embodiment, the look up table 52 may include 1024 elements of a non-linear function associated with the blue component of pixels of a surface represented in a RGB color space. The look up table 54 and the look up table 56 may each include 1024 elements of a non-linear function, respectively. Each element of a non-linear function may include 10 bits. Each set of 1024 elements of the non-linear function may be used for respectively processing the green component and the red component of pixels of the same surface represented in RGB color space, respectively. In accordance with other embodiments, the number of locations included in the look up tables may differ from one look up table to the other.

As illustrated in FIG. 3, the data path 48 may include three channels 58, 60 and 62 of image data. In accordance with one embodiment, the three channels 58, 60 and 62 may be implemented as three separate physical channels where each channel receives a set of bits associated with a determined color component which may differ from the color component of others of the channels. In another embodiment, the three channels 58, 60 and 62 may be implemented as a unique physical channel for receiving bits of a pixel provided from a source of surfaces. The source of surfaces may be the video memory 42 shown in FIG. 2 or a processing stage of the data path 48 preceding the look up tables.

In accordance with one embodiment, the data path 48 may include a gray converter 50. The gray converter 50 may include a plurality of inputs 51A, 51B and 51C. The input 51A may be connected to the channel 58, the input 51B may be connected to the channel 60 and the input 51C may be connected to the channel 62. The gray converter 50 may further include an output 53 connected to a multiplexer 59.

In accordance with one embodiment, the look up tables 52, 54 and 56 may include, respectively, an input 55A, 55B and 55C. Further, each look up table may include one or a plurality of outputs. In the illustrated embodiment, the look up table 52 includes at least one output 63A, the look up table 54 includes at least three outputs 63B, 65A and 65B and the look up table 56 includes at least one output 63C.

As illustrated in FIG. 3, the data path 48 may include a set of multiplexers 57 (57A, 57B, 57C, 57D, 57E, 57F) and a multiplexer 61. In the illustrated embodiment, the input 55A of the look up table 52 is connected to a channel receiving data from the multiplexer 59. The multiplexer 59 allows the selection between data provided from the channel 58 and data output by the gray converter 50 through the output 53. The input 55B of the look up table 54 is connected to the multiplexer 57F. The multiplexer 57F is connected to the channel 60 and to the channel receiving data from the multiplexer 59. The input 55C of the look up table 56 is connected to the multiplexer 57E. The multiplexer 57E is connected to the channel receiving data from the multiplexer 59 and to the channel 62. In the illustrated embodiment, the output 63A of the look up table 52 is connected to the multiplexer 57A. Further the multiplexer 57A is connected through an input 64A to the channel receiving data from the multiplexer 59. The multiplexer 57A is also connected via an output to the multiplexer 61. The outputs 65A and 65B are connected to the multiplexer 57B. The multiplexer 57B is connected to the channel 60 through an input 65C. The multiplexer 57C is connected to the channel 60 through an input 64B, to the output 63B of the look up table 54 and to the multiplexer 57B. The multiplexer 57C is further connected to a channel 70. The multiplexer 57D is connected to the channel 62 and to the output 63C of the look up table 56. The multiplexer 57D is also connected to the multiplexer 61 and to a channel 72.

The channels 68, 70 and 72 may be connected to an output port configured to output data from a display controller. Alternatively, the channels 68, 70 and 72 may be connected to another processing module or storage module of the data path 48.

In some embodiments the data path 48 may include other components that are not shown in FIG. 3. For example, the data may include a memory receiver for receiving and formatting data provided from the video memory. In one embodiment the memory receiver includes a plurality of FIFOs and control circuitry for receiving data from the video memory at a first data rate and under a first data format. The control circuitry may format the data before being transferred through the channel 58, 60, 62 and 74 to the look up tables 52, 54 and 56. The look up tables 52, 54 and 56 may receive the data at a second data rate and with a second data format.

In accordance with one embodiment, at each clock cycle the channels 58, 60 and 62 may receive a finite number of binary elements representative of the color components of a pixel. In one example the channel 58 may receive 10 bits corresponding to the blue component of the pixel, the channel 60 may receive 10 bits corresponding to the green component of the same pixel and the channel 62 may receive 10 bits corresponding to the red component of the same pixel. The RGB color space is provided as a non-limiting example of a color space for the surface processed in the data path 48. In some embodiments, other color spaces may be used, for example, YUV, YCbCr or grayscale color space. In another embodiment, the channel 58 may be associated with the Y component of a pixel, the channel 60 may be associated with the U component of a pixel and the channel 62 may be associated with the V component of a pixel when a surface is represented in YUV color space. In a third embodiment, a surface may be represented in a grayscale color space and each pixel of a surface includes a single color component. In this embodiment, a single channel or a combination of at least two channels may be associated with the single color component.

In accordance with one embodiment, a surface is retrieved from video memory as a set of pixels and may be pre-processed before being forwarded to the look up tables 52, 54 and 56.

In the illustrated embodiment, gray converter 50 may receive the red, green and blue components of a pixel and convert the color components into a unique monochrome component. In this embodiment the monochrome component may be selected at the multiplexer 59 and sent through the channel 74 to be processed by one of the look up tables 52, 54 or 56.

In accordance with various embodiments, the look up tables 52, 54 and 56 may be configured to process a plurality of different formats of surfaces. In accordance to one embodiment, the look up tables 52, 54 and 56 may be configured to process a single surface stored in the video memory in RGB color space. The look up table 52 may be configured to include elements of a non-linear function to process a first color component of the pixels forming the single surface. The look up table 54 may be configured to include elements of the same non-linear function to process a second color component of the same pixels. Look up table 56 may be configured to include elements of the same non-linear function to process a third color component of the same pixels forming the single surface. In one embodiment, the blue component of the pixels forming the surface may be processed using the look up table 52, the green component of the pixels may be processed using the look up table 54 and the red component of the pixels may be processed using the look up table 56.

In accordance to another embodiment, the look up tables 52 and 54 may be configured to include the elements of a non-linear function and further employed in combination to process a single color component of pixels forming a single surface. In one embodiment, each look up table may include 1024 locations for storing 1024 elements of 10 bits each. According to this embodiment, each one of the look up tables 52, 54 and 56 may be configured to process a color component of a size up to 10 bits. In this example if a color component's format includes more than 10 bits, 1024 locations are not sufficient to process the color component without loss of precision.

In the illustrated embodiment, the look up tables 52, 54 and 56 may be configured to include elements of a non-linear function for processing a single color component with a high degree of precision. In one example, a surface may be retrieved from video memory in grayscale format. Each pixel of the surface includes a single color component to be processed according to a non-linear function. In this example the look up table 52, the look up table 54 and the look up table 56 may be configured to process in combination a gray component of 11 bits. In one embodiment, the look up table 52 and the look up table 56 may be configured to each include half of the 2048 elements of the non-linear function. The look up table 54 may be configured to include in the portion 54A 1024 bits where each bit is associated with one element of the 1024 elements stored in the look up table 52. The look up table 54 is also configured to include in the portion 54B 1024 bits where each bit is associated with one element of the 1024 elements stored in the look up table 56.

In accordance with one embodiment, the most significant bit of the color component of a pixel may be sent to control circuitry of the data path 48 using the channel 60 while the 10 least significant bits of the color component may be sent through the channel 58. The 10 least significant bits of the color component are selected by the multiplexer 59 and sent to the input 55A of the look up table 52 and sent to the multiplexer 57F and the multiplexer 57E. The multiplexer 57E is configured to select data provided from the multiplexer 59 and send it to the input 55C of the look up table 56. The 10 least significant bits of the color component input at the input 55A and the input 55C are used as an index to access a location in the look up table 52 and the look up table 56. Each location accessed in the look up table 52 and in the look up table 56 may include 10 bits of data which is a portion of the element of the non-linear function corresponding to the gray component of the currently processed pixel. A portion of a first element is output from the lookup table 52 through the output 63A and sent to the multiplexer 57A and further sent to the multiplexer 61. A portion of a second element is output from the look up table 56 through the output 63C and sent to the multiplexer 57D and further sent to the multiplexer 61. In some embodiments, the location accessed in the look up table 52 using the 10 least significant bits of the color component is identical to the location accessed in the look up table 56 using the same 10 least significant bits.

Further, the look up table 54 may be configured to include the most significant bit of the two elements of the non-linear function corresponding to the same gray component processed in the look up tables 52 and 56. The same 10 least significant bits of the color component may be simultaneously used to access a location in the look up table 54. The 10 least significant bits of the color component provided from the multiplexer 59 are selected by the multiplexer 57F to be used as an index to access a location in the look up table 54. In this example only one out of the 10 bits stored at each location is needed to add precision to the element of the non-linear function corresponding to the processed color component. The look up table 54 may be used to retrieve two bits for each processed color component. A first bit is selected from the portion 54A of the look up table 54 and a second bit is selected from the portion 54B of the look up table 54. The two bits may be output at the outputs 65A and 65B respectively and sent to the multiplexer 57B. The multiplexer 57B may be configured to select one of the two bits using the most significant bit of the color component provided from the channel 60 and input at the input 65C. The selected bit is later sent to the channel 70.

Further the most significant bit of the color component of each pixel is used to select one of the two inputs of the multiplexer 61 and output the selected data to the channel 68. Finally, data received at the channels 68 and 70 may be combined to form a color component of 11 bits and may be either sent to another processing stage of the data path 48 or to an output of the display controller.

In some embodiments, the look up table 54 may be used to retrieve more than one bit for each pixel processed, for example, where the display controller receives 11 bits as an input and provides a 12-bit output. That is, in one embodiment, the available capacity of the look up table 54 is used to provide two additional bits for each element of the non-linear function stored in the look up table 52 and the look up table 56.

In accordance to another embodiment, the look up tables 52, 54 and 56 may be configured to include two different non-linear functions to process the same color component of pixels forming two different surfaces in video memory. In the illustrated embodiment, the look up table 52 and the look up table 54 may be configured to include elements of a first non-linear function to process a color component of pixels of a first surface stored at a location in video memory. The look up table 56 may be configured to include elements of a second non-linear function to process a color component of pixels of a second surface stored at a different location in video memory.

In some embodiments, the read memory requester 34 of the display controller 30, illustrated in FIG. 2, may request that the memory controller read two different surfaces, each one of them including a different set of pixels stored at distinct locations in video memory. The control unit 32 and the read memory requester 34 of the display controller 30 may control the transfer of the two surfaces through the channels 58, 60 and 62 to the various processing stages of the data path 38. As illustrated in FIG. 3, according to one embodiment, a first portion of the first surface may be transferred for processing by the look up tables 52, 54 and 56, followed by a first portion of the second surface to be processed by the look up tables 52, 54 and 56. Furthermore, a second portion of the first surface may be processed by the look up tables 52, 54 and 56 and then a second portion of the second surface may be processed by the look up tables 52, 54, 56.

In another embodiment, a first portion of the first surface may be transferred through the channels 58, 74 and 60 for processing using a combination of the look up table 52 and the look up table 54, while a first portion of the second surface may be transferred through the channel 58 and 74 for processing using the look up table 56. According to one embodiment, the look up tables 52 may be configured to include elements of a first non-linear function and the look up table 54 may be configured to include additional bits for the same non-linear function. These additional bits may be employed to add precision to one or more elements of the first non-linear function.

In one example, the first surface is represented in a grayscale color space and each pixel includes a single color component. The color component of each pixel is used as an index to access an element at a first location in the look up table 52, an element at a second location in the look up table 54 and to access an element at a third location in the look up table 56. In some embodiments all bits of the color component may be used as an index and in other embodiments a portion of the bits is used as an index to access a location in a look up table. Data output from the look up table 52 is sent to the multiplexer 57A and selected to be sent to the multiplexer 61. Data output from the look up table 56 is sent to the multiplexer 57C and is selected to be sent to the multiplexer 61. The multiplexer 61 selects one of the two inputs and outputs the element coming from the look up table 52 when the first surface is being processed. In some embodiments, each pixel of a surface may further include at least one bit which identifies to the multiplexer 61 the surface to which the pixel belongs. The selection of the output of the multiplexer 61 is performed according to the identification provided by the bit (or bits).

In one embodiment, the read memory requester may send control data to the multiplexer 61 in synchronization with the color component being processed. The multiplexer 61 outputs the element provided from the look up table 52 to the channel 68 when the first surface is being processed according to the control data received from the read memory requester. Data output to the channel 68 may be combined with data output at the channel 70 which is provided from the look up table 54. In some embodiments, data transferred on the channel 70 may be used to modify data provided from the look up table 52 and output on the channel 68. The modification process is not shown on FIG. 3 and may be performed at another processing stage of the data path 48 or later at the output port of the display controller. For example, data output at the channel 70 may be used to adjust the non-linearity of a digital-to-analog converter (DAC) connected to the output of the display controller. In another example data output at the channel 70 may be used to add precision to the pixel's color component output in the channel 68.

According to the illustrated embodiment, the look up table 56 may be configured to include elements of a second non-linear function. In one example, the second surface is represented in grayscale color space and is transferred using the channel 58 and 74 to the look up table 52, the look up table 54 and the look up table 56. The color component of a pixel is used as an index to access an element at a first location in the look up table 52 and an element at a second location in the look up table 54 which include the first non-linear function. Further the color component of a pixel is used to access an element at a third location in the look up table 56 which includes the second non-linear function. Data output from the look up table 56 is sent to the multiplexer 57D and selected to be sent to the multiplexer 61. Data output from the look up table 52 is sent to the multiplexer 57A and selected to be transferred to the multiplexer 61. Data output from the look up table 54 is sent to the multiplexer 57C and is selected to be sent to the channel 70. The multiplexer 61 outputs data provided from the look up table 56 when the pixels of the second surface are being processed.

In one embodiment the read memory requester may send control data to the multiplexer 61 in synchronization with the color component being processed. The multiplexer 61 outputs the element coming from the look up table 56 to the channel 68 when the second surface is being processed according to the control data received from the read memory requester.

In some embodiments, the multiplexer 61 may be used to output elements of the first non-linear function corresponding to a first portion of the first surface followed by elements of the second non-linear function corresponding to a first portion of the second surface before outputting elements of the first non-linear function corresponding to a second portion of the first surface. According to one embodiment, data output at the channels 70 and 72 may be discarded and may not be transferred to another processing stage of the data path 48. In one example, if data selected at the multiplexer 61 corresponds to the second surface, data output at the channels 70 and 72 may be discarded.

According to another embodiment, the look up tables 52, 54 and 56 may be used to process image data in RGB color space. In some embodiments, the look up tables 52 and 56 may be configured to be used in combination to include a first non-linear function to correct the blue color component of a pixel and the look up table 54 may be configured to include a second non-linear function to correct the red color component while the green color component is not altered by any of the two non-linear functions. In some other embodiments, only one of the color components of each pixel is processed using one of the three look up tables 52, 54 and 56, two of the three look up tables 52, 54 and 56 or each of the three look tables 52, 54 and 56.

Figure 4:
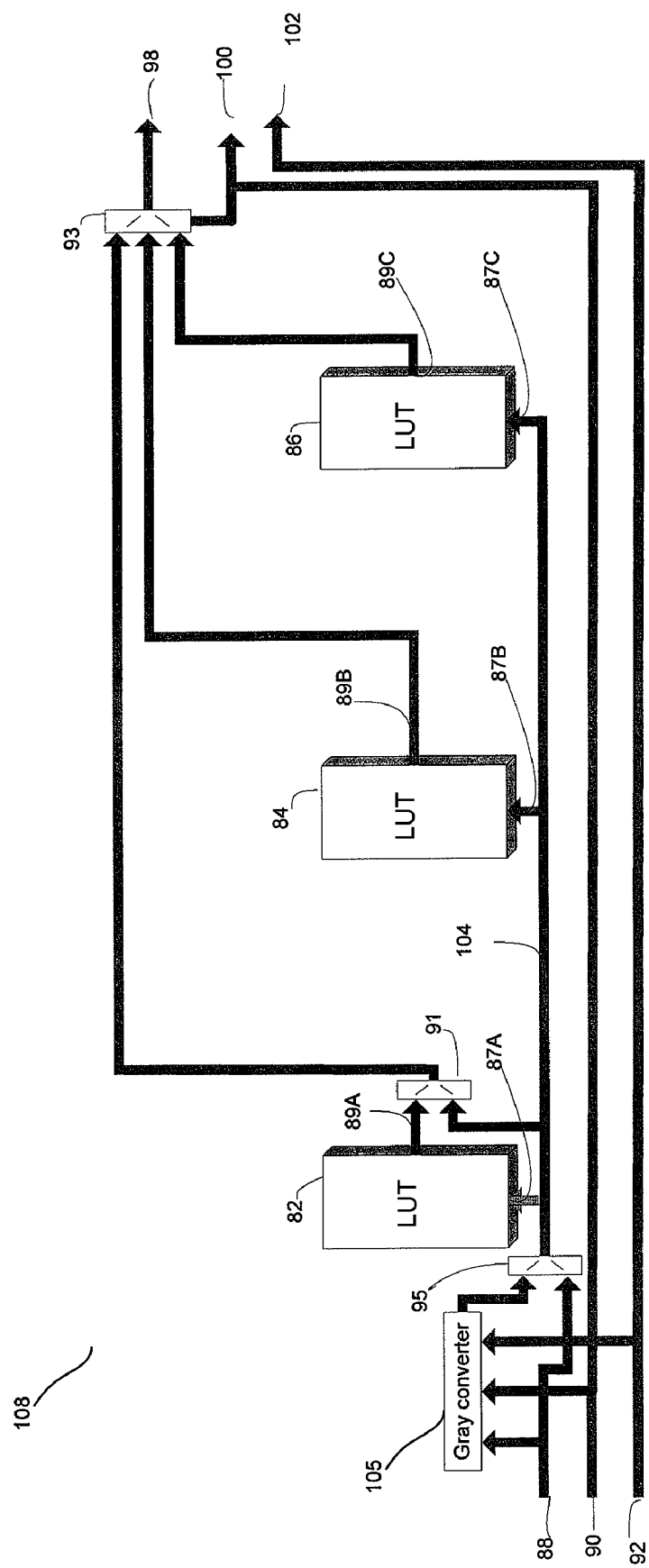
FIG. 4 illustrates a plurality of look up tables of a display controller in accordance with an embodiment of the invention.

Referring now to FIG. 4, a data path 108 may include the channels 88, 90, 92 and 104. The data path 108 may include a gray converter 105, a first look up table 82, a second look up table 84 and a third look up table 86. The data path 108 may further include a plurality of multiplexers 91, 93 and 95. The channels 88, 90 and 92 are connected to the gray converter 105. The gray converter 105 is connected to the multiplexer 95. The multiplexer 95 is connected to the channel 104 and to the look up table 82 through an input 87A. The multiplexer 95 is further connected to the look up table 84 through an input 87B and to the look up table 86 through an input 87C. The channel 90 is connected to a channel 100 and the channel 92 is connected to a channel 102. The look up table includes an output 89A connected to the multiplexer 91. The multiplexer 91 is also connected to a channel connected to the multiplexer 95 and is further connected to the multiplexer 93. The look up table 84 includes an output 89B connected to the multiplexer 93. The look up table 86 connected to the multiplexer 93. The multiplexer 93 is connected to the channel 98 and to the channel 90. The illustrated connection links between the different modules of the data path are used to transfer bits of color components of pixels, and may also be used to transfer control data.

In accordance with the illustrated embodiment, the look up tables 82, 84 and 86 may be configured to include different non-linear functions for processing various portions of a single surface processed in the data path 108. According to one embodiment, a portion of a single surface may require a particular color modification while another portion of the same single surface requires another color modification. In one example, a surface may be stored in video memory in grayscale color space and may need to be processed for display on a monitor.

In accordance with one embodiment, a surface may be divided into three different portions that require a different color modification. For example, the look up table 82 may be configured to include elements of a first non-linear function to provide a first color modification, the look up table 84 may be configured to include elements of a second non-linear function to provide a second color modification and the look up table 86 may be configured to include elements of a third non-linear function to provide a third color modification.

As illustrated in FIG. 4, the channels 88 and 104 may be used to communicate pixels of a surface to be processed by non-linear functions in the look up tables 82, the look up table 84 and the look up table 86. The channel 90 may be used to communicate data used to control the output of the multiplexer 93. According to one embodiment monochrome color components of pixels are transmitted through the channel 88 and selected by the multiplexer 95 to be processed by at least one of the non-linear functions stored in the look up tables 82, 84 and 86. In another embodiment the color component of the pixels of a surface is transmitted through the channel 104 to be processed simultaneously by the three non-linear functions stored in the look up table 82, the look up table 84 and the look up table 86. The color component of each pixel is used as an index to access a location of an element of a non-linear function in each one of the look up tables 82, 84 and 86.

A first element is output from the look up table 82 and is sent to the multiplexer 91 to be selected and sent to the multiplexer 93. A second element is output from the look up table 84 and sent to the multiplexer 93 and a third element is output from the look up table 86 and sent to the multiplexer 93. Control data sent through the channel 90 is used to determine which one of the first element, second element and third element should be output from the multiplexer 93 to the channel 98. According to one embodiment, the control data identifies whether the pixel to be processed belongs to a first region, to a second region or to a third region of the processed surface. Thus, in some embodiments, all the pixels of a surface are processed by the three non-linear functions stored in the look up table 82, the look up table 84 and the look up table 86, and the image which is output from the multiplexer 93 includes a subset of the pixels processed with the elements included in the look up table 82, a subset of the pixels processed with the elements included in the look up table 84 and a subset of the pixels processed with the elements included in the look up table 86. According to one embodiment, the three subsets comprise all the pixels of the image.

In some embodiments, one or more regions of a surface may not be processed by any of the look up tables. Instead, in these embodiments, the color components of the pixels belonging to these regions are sent to the multiplexer 91 from the channel 104 and are selected at the output of the multiplexer 91 to be transferred to the multiplexer 93. Finally, the pixels are output from the multiplexer 93 without being processed by any of the look up tables 82, 84 and 86.

In another embodiment, the control data may be further output through the channel 100. For example, the control data may be provided to an external processing unit which employs the control data to determine whether the data output from the channel 98 has been processed according to a non-linear function. The control data may further be used by the external processing unit to apply one or more additional non-linear functions, to one or more additional regions of the processed surface (for example, a fourth non-linear function which is applied to a fourth region of the processed surface).

In one embodiment, the system illustrated in FIG. 4 includes circuitry illustrated in FIG. 3, such as multiplexers 57B, 57C or 57D. Further, the look up tables 82, 84 and 86 may be configured in a variety of processing modes suited for use with these different hardware configurations.

In accordance with one embodiment, the look up tables 82, 84 and 86 may be configured to process a single surface, or at least two surfaces requested from the video memory by a single read memory requester of a display controller. According to one embodiment, the look up tables 82, the look up table 84 and the look up table 86 may be configured such that at least two of the three look up tables are used in combination to process the same color component of pixels forming a single image. According to another embodiment, the look up table 82, the look up table 84 and the look up table 86 may be configured to include different non-linear functions such that each look up table is used for processing the same color component of pixels forming a portion of a single image.

Figure 5:
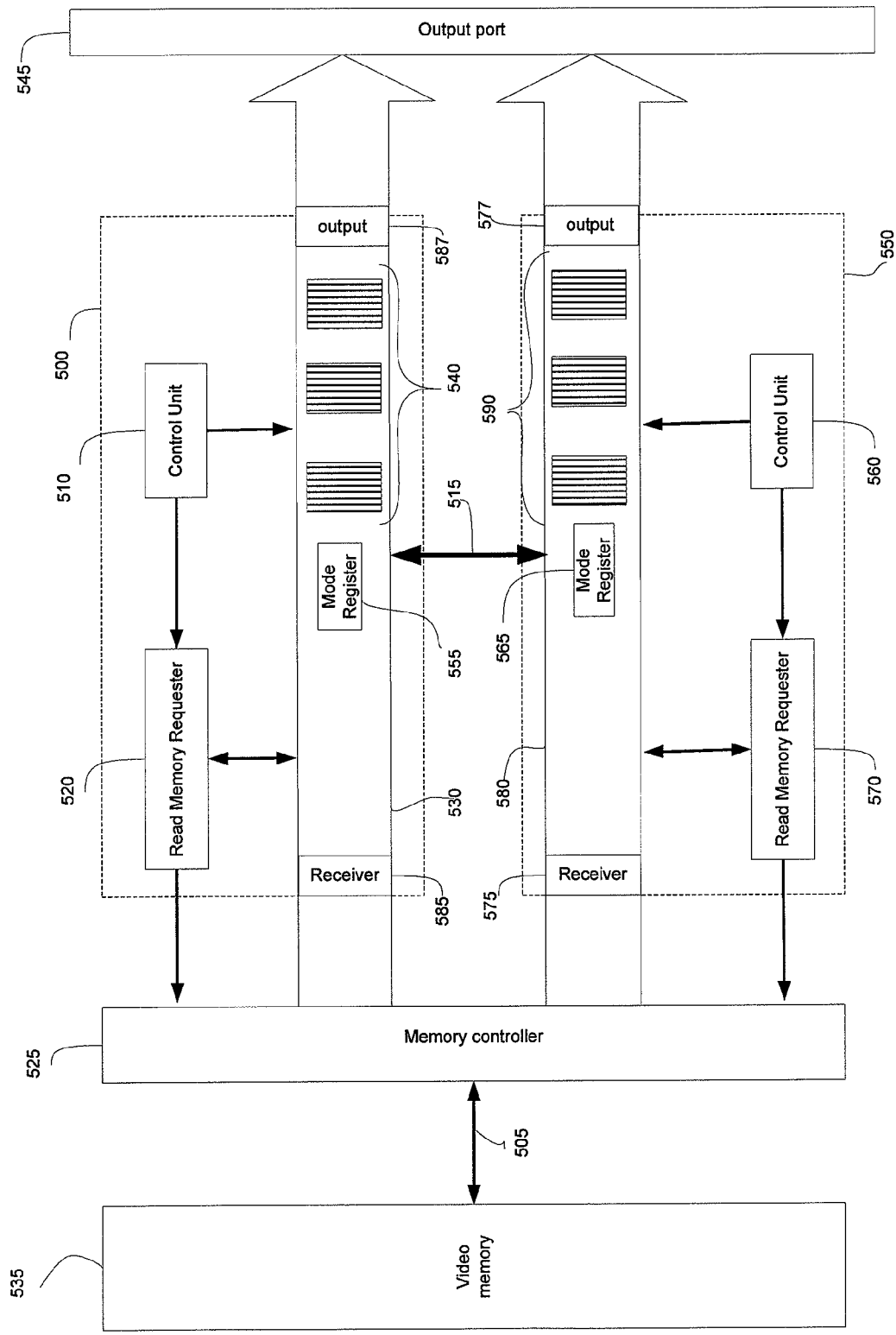
FIG. 5 illustrates a plurality of display controller connected to a video memory in accordance with an embodiment of the invention.

As illustrated in FIG. 5, a graphics system may include at least two display controllers. According to the illustrated embodiment, a first display controller 500 is connected to a memory controller 525 and to an output port 545 of the graphics processing system and a second display controller 550 is connected to the memory controller 525 and to the output port 545. Further, the memory controller 525 is connected to a video memory 535 through a communication link 505. In accordance with the illustrated embodiment, the first display controller 500 includes a first control unit 510, a first read memory requester 520 and a first data path 530 comprising a first plurality of look up tables 540. Further, according to this embodiment, the first control unit 510 is connected to the first read memory requester 520 and to the first data path 530 and the read memory requester 520 is also connected to the memory controller 525 and the data path 530.

According to the illustrated embodiment, the second display controller 550 includes a second control unit 560, a second read memory requester 570 and a second data path 580 comprising a second plurality of look up tables 590. Further, according to this embodiment, the second control unit 560 is connected to the second read memory requester 570 and to the second data path 580, and the second read memory requester 570 is connected to the memory controller 525 and to the data path 580. The different communication links between the modules included in the memory controller may be unidirectional or bidirectional. The communication links may be used to transfer any of data, instructions or control data either alone or in combination.

Further a communication link 515 may connect the first display controller 500 to the second display controller 550. The communication link may be used to transfer instructions, control data and data from a display controller to another. In one embodiment, the communication link 515 may be used to transfer control data and color components of a pixel such that at least one look up table of the first plurality of look up tables is employed in combination with the second plurality of look up tables.

In accordance with some embodiments, the first display controller 500 includes a first mode register 555 and the second display controller 550 includes a second mode register 565. In the illustrated embodiment, the mode registers 555, 565 are located in the first data path 530 and the second data path 580, respectively. However, in an alternate embodiment the mode registers 555, 565 are located elsewhere in the display controllers 500, 550, respectively.

According to some embodiments as described in greater detail herein the mode registers 555, 565 can be employed to set up the respective display controller to employ a combination of lookup tables included in the display controller to process a component of a plurality of pixels. In a further embodiment, the mode registers 555, 565 can be employed to set up the respective display controller to employ a combination of look up tables including look up tables of others of display controllers to process a component of a plurality of pixels.

In accordance with some embodiments, each display controller includes a receiver which can be employed as an input to the data path of a display controller. Accordingly, in FIG. 5, the first display controller 500 includes a first receiver 585 and the second display controller 550 includes a second receiver 575. According to another embodiment, a single receiver is employed as an input to a plurality of data paths where each data path employed with a display controller differs from data paths employed with others of the display controllers. According to some embodiments, three or more display controllers may be employed with a single receiver.

Further, in some embodiments, each display controller includes an output which can be employed as an output to the data path of a display controller. Accordingly, in FIG. 5 the first display controller 500 includes a first output 587 and the second display controller 550 includes a second output 577. In various embodiments, an output of a display controller may include an output of a circuit which is included in the display controller, for example, an output of any of a look up table, a FIFO and a blender.

In some embodiments, look up tables from a combination of three or more display controllers are used together to process a single surface. According to one embodiment, the preceding approach allows pixels to be processed with an even greater degree of precision. That is, although a single look up table or set of look up tables may only provide a fixed maximum size, the ability to combine look up tables from multiple display controllers to process a video surface provides a system with the capability to meet changing processing demands.

Figure 6:
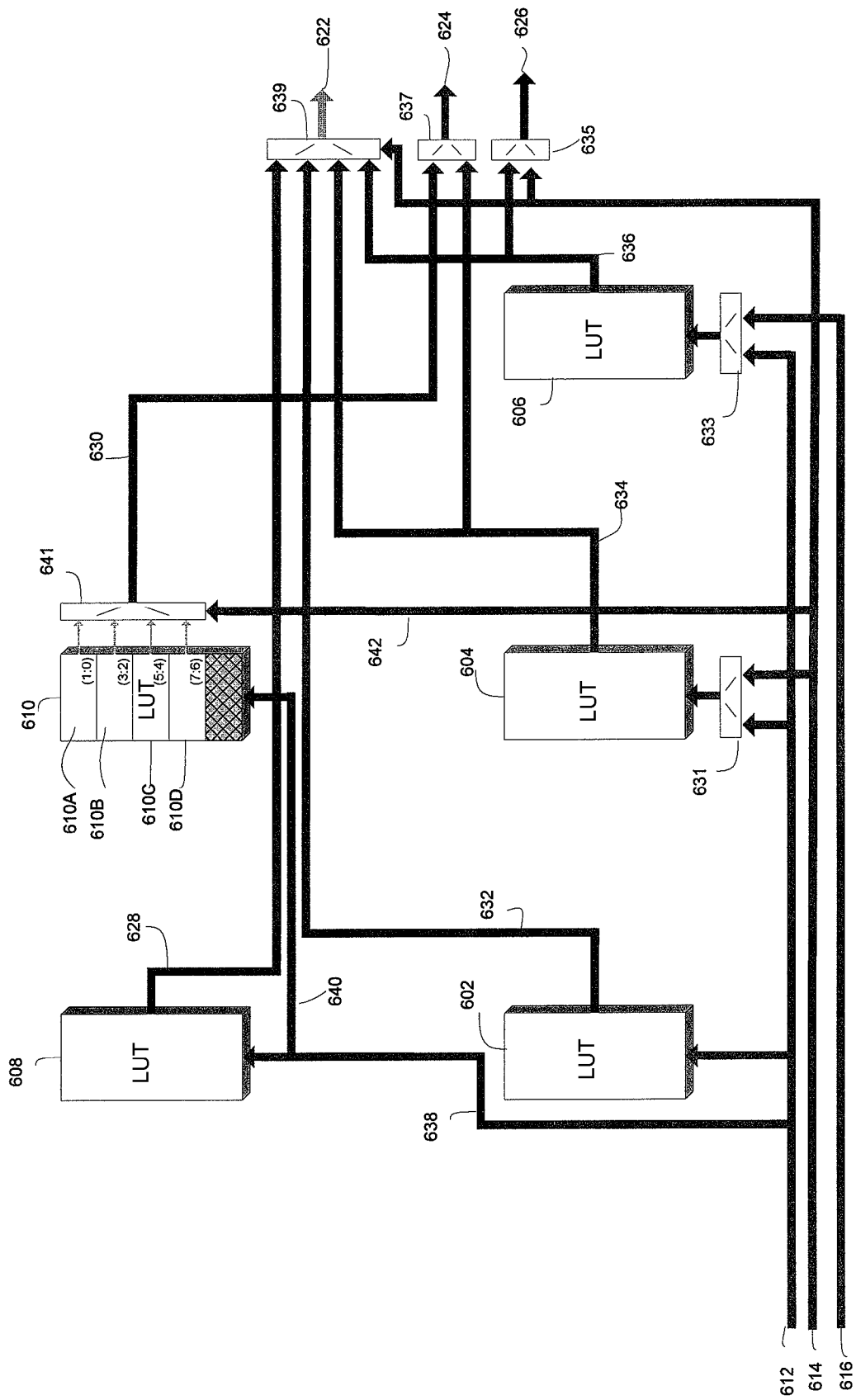
FIG. 6 illustrates a first plurality of look up tables included in a first display controller and a second plurality of look up tables included in a second display controller in accordance with an embodiment of the invention.

According to the embodiment illustrated in FIG. 6, a system includes a first plurality of look up tables included in a first display controller that can be employed in combination with one or more look up tables from a second plurality of look up tables included in a second display controller. A look up table 602, a look up table 604 and a look up table 606 are included in a first data path of a first display controller. A look up table 608 and a look up table 610 are part of a plurality of look up tables included in a second data path of a second display controller. In one embodiment, the first display controller and the second display controller are connected to a video memory of a graphics processing system, for example, through a memory controller.

The first data path may include a plurality of multiplexers. For example, in the illustrated embodiment, the first data path includes a multiplexer 631, a multiplexer 633, a multiplexer 635, a multiplexer 637 and a multiplexer 639. The look up table 602 may be connected to a first input channel 612 and to an output channel 632. The second look up table 604 may be connected to the multiplexer 631 and to an output channel 634. The third look up table 606 may be connected to the multiplexer 633 and to an output channel 636. The multiplexer 631 may be connected to the channel 612 and to the channel 614. The multiplexer 633 is connected to the channel 612 and to the channel 616.

According to some embodiments at least a portion of one or more of the channels 612, 614 and 618 included in the first data path are connected to the second display controller when the display controllers are configured for processing in combination with one another. Accordingly, in the illustrated embodiment, each of the channels 638, 640 and 642 are provided to the second display controller. Further, in some embodiments, the channels 638, 640 and 642 are included in a communication link which couples the first display controller to the second display controller, for example, the communication link 515 illustrated in FIG. 5.

The second data path may include the first look up table 608, the second look up table 610, the multiplexer 641 and other circuitry and modules that are not shown in FIG. 6, for example, a plurality of channels of a second data path.

The first look up tables 608 and the second look up table 610 of the second data path may be connected to the channel 612. Further, the look up tables 608 and 610 may be connected to channels included in the second data path. The look up table 608 may be connected to an output 628 and the look up table 610 may be connected to the multiplexer 641. The look up tables 608 and 610 may also be connected to output channels of the second display controller (not shown in FIG. 6), these channels may transfer data to outputs or to other processing stages when the look up tables are used to process data of the second display controller.

The channels 628, 632, 634 and 636 are connected to the multiplexer 639. The multiplexer 639 is connected to an output channel 622. The multiplexer 641 connected to the multiplexer 637 through the channel 630. The multiplexer 637 is connected to the channel 634 and to the channel 624. The multiplexer 635 is connected to the channel 614, to the channel 636 and to the channel 626. The output channels 622, 624 and 626 may be connected to other processing stages of the data path or to an output port of the first display controller.

In one embodiment, the look up tables 602, 604 and 606 of the first display controller may be used to process data independently of the data processed by the second plurality of look up tables comprising the look up tables 608 and 610. In one example, the first plurality of look up tables is used to process color components of pixels of a first surface and the second plurality of look up tables is used to process color components of pixels of a second surface.

That is, as mentioned above, FIG. 6 only illustrates the first look up table 608, the second look up table 610 and the multiplexer 641 of the second display controller (along with portions of first data path included in the second display controller) but does not illustrate any of the channels included in the second data path and connected to any of the look up tables 608, 610 in some configurations of the second display controller.

In another embodiment, the look up tables 602, 604 and 606 are employed in combination with the look up tables 608 and 610 to process a color component of pixels of the same surface.

In accordance with one embodiment, the look up table 602 may be configured to include elements of a first non-linear function. The look up tables 604 may be configured to include elements of a second non-linear function. The look up tables 606 and 608 may be configured to include elements of a third and elements of a fourth non-linear function, respectively. The look up table 610 may be configured to include in the portion 610A bits of data associated with elements of the first non-linear function. In the portion 610B, the look up table 610 may include bits of data associated with elements of the second non-linear function. In the portions 610C and 610D, the look up table 610 may be configured to include bits of data associated with elements of the third non-linear function and the fourth non-linear function, respectively. In one embodiment, each non-linear function stored in the look up tables may be used to process a color component of a pixel which is part of a portion of a surface. In this embodiment, the display controller may retrieve a grayscale surface including four portions. Each portion includes a set of pixels. In one embodiment, the pixels belonging to a portion are not necessarily adjacent.

In accordance with one embodiment, the color component of each pixel is sent to each one of the look up tables 602, 604, 606, 608 and 610 through the channel 612. In the look up tables 602-608, the color component is used as an index to retrieve an element of a non-linear function which is sent to the multiplexer 639. In the look up table 610, the color component may be used to retrieve two bits from each portion 610A, 610B, 610C and 610D. These bits are sent to the multiplexer 641. Further, the channel 614 may be used to transfer information regarding the portion of the surface comprising the pixel being processed. The multiplexers 641 and 639 receive information from the channel 614 that determines which element should be output to the channels 624 and 622 respectively. According to the portion of the surface being processed, the output of one look up table is chosen and sent to the channel 622, and an output is chosen from a portion of the look up table 610 and sent to the channel 624.

In some embodiments, the channel 614 may also transfer information to the channel 626. In some embodiments, the surface may include more than four portions and the color component of the pixels of the portions that are not processed in the look up tables of the first and second display controller may need to be modified. According to one embodiment, the information output at the channel 626 may be used by other processing stages or by external processors to process the color component of pixels of the unprocessed portions according to other non-linear functions. In other embodiments, the data output through the channel 624 may be used to add precision to the element output at the channel 622.

In some embodiments, the data path of the second display controller may include a third look up table. While two of the look up tables may be used in combination with the look up tables of the first display controller, the third look up table of the second display controller may be used to process data in the second display controller. In other embodiments, the three look up tables of the second display controller may be used in combination with the look up tables of the first display controller, in this case, data processed in the second display controller is not altered by non-linear functions. In another embodiment, only one of the look up tables of the second display controller is employed in combination with the look up tables of the first display controller.

In general, graphics processing systems are customarily designed to accelerate generation of 2D and 3D surfaces (e.g. for gaming purposes) for display of the images on a monitor. Further, current computer systems may use a graphics processing system to perform a variety of additional tasks. Examples of such new applications include medical imaging, where graphics processing systems may be used to enhance image quality and display images on monitors. Video editing, video playback and digital signage are other examples of applications that may use a graphics processing system. These new applications may handle various formats of data, in terms of color spaces and pixel's size. Accordingly non-linear functions applied on data may differ according to the format of the data and the color space used to represent it. Furthermore, the type of non-linear function which is applied may vary according to the user requirements or the type of material used for display (LCD screens, Television, computer monitors, etc.).

Any of the preceding embodiments may be provided in a computer system including a display controller of a graphics processing system. In accordance with one embodiment, the computer system may include a driver which can be used to configure the data path of the display controller to set up the look up tables in a desired combination to process image data. In general, the driver is a software component used as a communication interface between the applications or the operating system running on the computer system and the hardware components of the display controller. According to these embodiments, the driver may set up the display controller in an operation mode to process data as requested by the computer system or a user. For example, the driver can set up the read memory requester, the control unit, the look up tables and any other module of the display controller.

Figure 7:
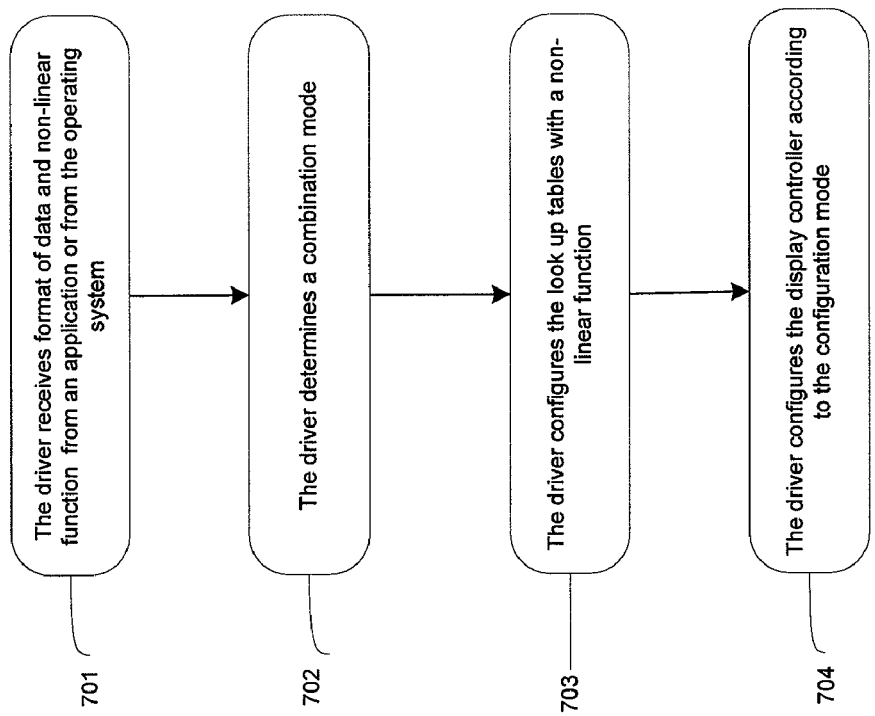
FIG. 7 is a flow chart illustrating a method of configuring a look up table in accordance with an embodiment of the invention.

In one embodiment, referring to FIG. 7 step 701, an application or the operating system may transmit information to the driver regarding the type and format of data to process and the non-linear functions required to process the data. At step 702 of FIG. 7, the driver may determine a combination mode. Further, at step 703 of FIG. 7, the driver may configure the look up tables with the appropriate elements of the non-linear functions. Finally, as shown at step 704 of FIG. 7, the driver may configure the display controller according to the combination mode which was determined at step 702.

According to one embodiment, the data path of a display controller may include three look up tables and a mode register. A user may request through an application or the operating system to set up the display controller for processing data with a determined non-linear function. The driver may determine a combination mode corresponding to the user's request. Further, the driver may set up the mode register with the combination mode. In some embodiments, the combination mode may be determined according to the surface's format and according to the non-linear function to use. In another embodiment, the mode register may be configured according to the number of bits used to represent a color component of a pixel of the surface and according to the number of locations (e.g., size) that each look up table may include. The value of the mode register may automatically set up the control circuitry and the look up tables of one or a plurality of display controllers to be used in combination. For example, if each look up table includes 1024 locations, in order to process a color component of 11 bits, two look up tables may be used in combination.

In accordance with one embodiment, the mode register may be connected to each one of the multiplexers connected to the different inputs and outputs of the look up tables. The mode register may configure each one of the multiplexers to allow the look up tables to process data in combination. According to one embodiment, the mode register is adapted to accept a fixed number of different modes which set up a finite number of possible configurations for the multiplexers connected to the look up tables. The different applications and the operating system running on the computer system may be given a list of surface formats and number of non-linear functions that the look up tables of the display controller may support.

In another embodiment, an application may configure individually through the driver each multiplexer connected to the different look up tables. This may allow a more flexible system, since more combinations of the look up tables may be possible.

The driver of the display controller may receive instructions from an application or from the operating system of the host system to configure each one of the plurality of look up tables with the appropriate non-linear function. In one embodiment, the channels used to carry data of a surface during the processing time may also be used to transfer the elements of the non-linear functions during the configuration step. For example the channels 58, 74, 60 and 62 in FIG. 3 or the channels 88, 104, 90 and 92 in FIG. 4, may be used to transfer the elements of a non-linear function to a corresponding look up table. Elements of the non-linear function are then stored in each look up table.

In another embodiment, dedicated data channels may be used to transfer the elements of a non-linear function to a corresponding look up table. For example in a display controller as shown in FIG. 2, interface 28 may be used to receive data from a host system and to transfer the data to an internal bus used by the display controller to configure the look up tables or the control circuitry. In one embodiment, the display controller may include a module that interprets the data received on the bus and transfers it to the appropriate registers of the different modules (e.g. the look up tables, the multiplexer, the FIFOs, etc. . . . ). In another embodiment, each module of the display controller (e.g. the look up tables, the multiplexer, the FIFOs, etc. . . . ) may include a sub-module that interprets the data received on the bus and writes to an appropriate register of the module.

Although the preceding embodiments are described with reference to three look up tables in each display controller, some embodiments may include only two look up tables while other embodiments may include four or more look up tables in each display controller. For example, in one embodiment, a display controller may include two look up tables. The display controller may include control circuitry such that the two look up tables may be used in combination with one another to process the same color component of a pixel. In other embodiments, the display controller may include more than two look up tables, and may also include control circuitry such that at least two of the look up tables may be used in combination with one another to process the same color component of a pixel. Further, although the look up tables are described to include non-linear functions, they may be used to modify color components of pixels using linear functions. In general, the look up tables may include any function that is used to process or modify the color component of a pixel. Further, the plurality of display controllers may include 3 or more display controllers.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for color modification of image data, the system comprising:
    a first display controller including a first plurality of look up tables included in a first data path that also includes a first plurality of data channels;
    a second display controller including a second plurality of look up tables included in a second data path including a second plurality of data channels, wherein the second data path is different than the first data path, the second plurality of data channels are different than the first plurality of data channels and the second plurality of lookup tables are different than the first plurality of lookup tables;
    a source of video surfaces coupled to each of the first plurality of data channels and the second plurality of data channels, wherein the source of video surfaces provides a video surface including a plurality of pixels to the first display controller on the first data path; and
    a communication link coupling at least one of the second plurality of look up tables to at least one of the first plurality of data channels, wherein data for a first component of the plurality of pixels is communicated via the communication link from the at least one of the first plurality of data channels to a look up table included in the second plurality of look up tables,
    wherein, in a first mode of operation, the first display controller is configured to employ at least one of the first plurality of look up tables to process and output the first component of the plurality of pixels without employing any data output by the second display controller, and
    wherein, in the first mode of operation, the second display controller is configured to employ the look up table included in the second plurality of look up tables to process and output the first component of the plurality of pixels without employing any data processed with any of the first plurality of look up tables.

2. The system of claim 1, wherein the video surface is a first video surface and the plurality of pixels are a first plurality of pixels, wherein the source of video surfaces provides a second video surface including a second plurality of pixels to the second display controller on at least one of the second plurality of data channels, and wherein, in a second mode of operation, the look up table included in the second plurality of look up tables processes a component of the second plurality of pixels.

3. The system of claim 1,
    wherein the first video surface is in a monochrome format,
    wherein, in the first mode of operation, the at least one of the first plurality of look up tables includes a first non-linear function to process the plurality of pixels of the monochrome surface,
    wherein, in the first mode of operation, the look up table included in the second plurality of look up tables includes a second non-linear function to process the plurality of pixels of the monochrome surface, and
    wherein the first display controller is employed to output a single image including some pixels processed by the first non-linear function and some pixels processed by the second non-linear function.

4. The system of claim 1, wherein the first display controller includes a first mode register employed to configure the first display controller to employ the at least one of the first plurality of look up tables in combination with the look up table included in the second plurality of look up tables.

5. The system of claim 4, wherein the second display controller includes a second mode register employed to configure the second display controller to employ the look up table included in the second plurality of look up tables in combination with the at least one of the first plurality of look up tables.

6. The system of claim 1, wherein, in the first mode of operation, each of the at least one of the first plurality of lookup tables and the lookup table included in the second plurality of lookup tables are programmed with elements of a single non-linear function for processing the first component of the plurality of pixels, the single non-linear function being the same non-linear function for each of the at least one of the first plurality of lookup tables and the lookup table included in the second plurality of lookup tables.

* * * * *